US010156445B2

(12) United States Patent
Foloppe et al.

(10) Patent No.: US 10,156,445 B2
(45) Date of Patent: Dec. 18, 2018

(54) INERTIAL MEASUREMENT DEVICE WITH DUAL SUSPENSION

(71) Applicant: SAFRAN ELECTRONICS & DEFENSE, Boulogne Billancourt (FR)

(72) Inventors: Yannick Foloppe, Boulogne Billancourt (FR); Guillaume Giboury, Boulogne Billancourt (FR)

(73) Assignee: SAFRAN ELECTRONICS & DEFENSE, Boulogne Billancourt (FR)

( * ) Notice: Subject to any disclaimer, the term of this patent is extended or adjusted under 35 U.S.C. 154(b) by 0 days.

(21) Appl. No.: 15/744,529

(22) PCT Filed: Jul. 26, 2016

(86) PCT No.: PCT/EP2016/067836
§ 371 (c)(1),
(2) Date: Jan. 12, 2018

(87) PCT Pub. No.: WO2017/021237
PCT Pub. Date: Feb. 9, 2017

(65) Prior Publication Data
US 2018/0195865 A1 Jul. 12, 2018

(30) Foreign Application Priority Data
Jul. 31, 2015 (FR) ..................................... 15 57416

(51) Int. Cl.
G01C 21/16 (2006.01)
F16F 15/08 (2006.01)
G01C 19/5783 (2012.01)

(52) U.S. Cl.
CPC .............. G01C 21/16 (2013.01); F16F 15/08 (2013.01); G01C 19/5783 (2013.01)

(58) Field of Classification Search
USPC ......................................................... 701/200
See application file for complete search history.

(56) References Cited

U.S. PATENT DOCUMENTS

| 7,845,226 B2* | 12/2010 | Ohkoshi | ................ G01C 19/56 73/493 |
|---|---|---|---|
| 2010/0011952 A1 | 1/2010 | Anderson | |
| 2010/0125404 A1* | 5/2010 | Anderson | .............. G01C 21/18 701/532 |
| 2012/0073372 A1* | 3/2012 | Theuss | .................... G01P 15/08 73/514.35 |
| 2013/0241376 A1 | 9/2013 | Chevalier et al. | |

* cited by examiner

Primary Examiner — Paul West
Assistant Examiner — Mark A Shabman
(74) Attorney, Agent, or Firm — Muncy, Geissler, Olds & Lowe, P.C.

(57) ABSTRACT

An inertial measurement device comprising a housing, a plate connected to the housing via a first stage of suspension, an inertial measurement unit comprising vibrating sensors having predetermined first resonant modes of vibration and mounted on the plate via a second stage of suspension; the first stage has a resonant frequency lower than a bandwidth of the inertial measurement unit, and the second stage has a resonant frequency higher than a resonant frequency of the first stage and lower than the first resonant modes of the vibrating sensors, the first stage having four resilient suspension elements and a center of stiffness corresponding substantially to the center of gravity of the assembly formed by the plate, the second stage, and the inertial measurement unit; the second stage having one to three resilient suspension elements.

4 Claims, 1 Drawing Sheet

INERTIAL MEASUREMENT DEVICE WITH DUAL SUSPENSION

The present invention relates to inertial measurement by means of movement sensors on board a vehicle, e.g. an aircraft, for the purpose of determining the attitude and/or the speed vector of the vehicle.

STATE OF THE ART

Inertial measurement devices are known that comprise a housing, a plate mounted in the housing via a first stage of suspension, and an inertial measurement unit mounted on the plate via a second stage of suspension. The second stage has a resonant frequency that is below the bandwidth of the inertial measurement unit and above a resonant frequency of the first stage. The first stage and the second stage each comprise four suspension elements. The housing is arranged to be fastened in the vehicle.

Such a structure is relatively bulky, thereby complicating installing the device in the vehicle. This drawback is particularly troublesome in certain applications that require equipment to be redundant, and thus require the ability to install a plurality of inertial measurement devices in the vehicle.

OBJECT OF THE INVENTION

An object of the invention is to provide an inertial measurement device that presents a structure that is more compact and less onerous to fabricate.

BRIEF SUMMARY OF THE INVENTION

To this end, the invention provides an inertial measurement device comprising a housing, a plate connected to the housing via a first stage of suspension, an inertial measurement unit comprising vibrating sensors and mounted on the plate via a second stage of suspension. The first stage has a resonant frequency lower than a bandwidth of the inertial measurement unit, and the second stage has a resonant frequency higher than a resonant frequency of the first stage. The first stage has four resilient suspension elements and a center of stiffness corresponding substantially to the center of gravity of the assembly formed by the plate, the second stage, and the inertial measurement unit. The second stage has one to three resilient suspension elements. The first stage filters impacts and vibration relative to the environment. The first stage absorbs large impacts and vibration at relatively low frequencies by having capacity for travel that is greater than that of the second stage (where capacity for travel is proportional to the reciprocal of the square of the resonant frequency). The second stage filters relatively high frequency vibration and prevents the plate from transmitting vibration from one of the sensors of the inertial measurement unit to another sensor of the inertial measurement unit: this avoids the sensors of the inertial measurement unit from disturbing one another mutually. The selective resonant frequencies enable the two stages of suspension to have resonant modes that are isolated from each other. This structure is most advantageous because of the compactness of the second stage of suspension, which enables the device to be compact while conserving filtering of vibration at relatively high frequencies.

Preferably, the second stage comprises three resilient suspension elements.

This arrangement of the second stage is the arrangement that gives best performance.

Advantageously, the second stage has a center of stiffness corresponding substantially to the center of gravity of the inertial measurement unit.

This gives better accuracy.

Other characteristics and advantages of the invention appear on reading the following description of particular non-limiting embodiments of the invention.

BRIEF DESCRIPTION OF THE FIGURES

Reference is made to the accompanying drawing, in which.

DETAILED DESCRIPTION OF THE INVENTION

Figure 1:
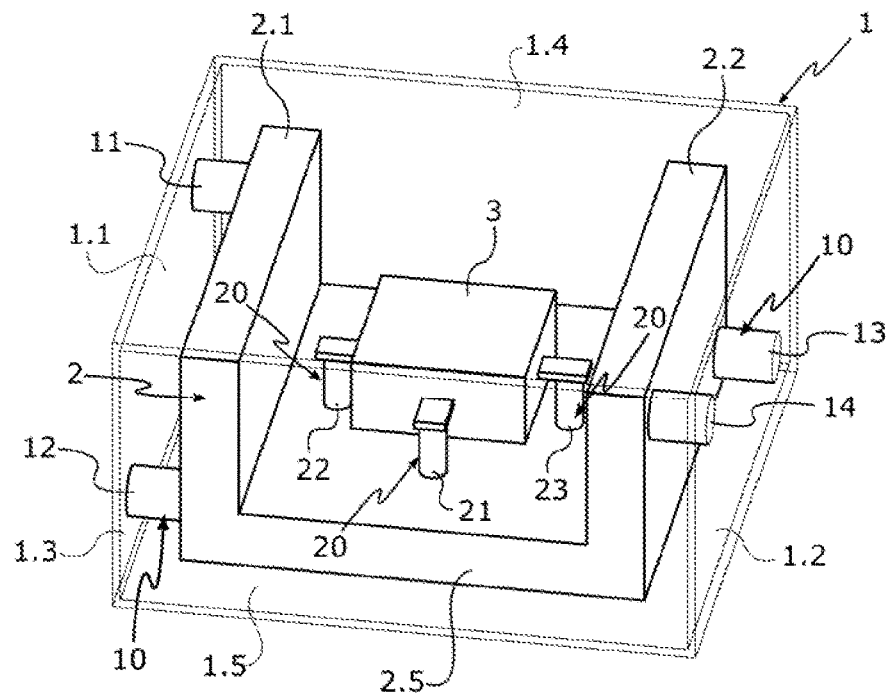
FIG. 1 is a diagrammatic perspective view of a device in a first embodiment.

With reference to FIG. 1, the device in the first embodiment of the invention comprises a housing given overall reference 1 (shown transparently in the figure), a plate given overall reference 2 and connected to the housing 1 via a first suspension stage given overall reference 10, and an inertial measurement unit 3 connected to the plate 2 via a second suspension stage given overall reference 20.

In this example, the housing 1 is in the form of a box of rectilinear or square section, defined by four sides 1.1, 1.2, 1.3, and 1.4, together with a bottom 1.5 for fastening rigidly to a carrier such as a vehicle. The box is open at the top facing the bottom, and the housing 1 includes a cover (not shown) for closing the housing.

In this example, the plate 2 is in the form of a rectangular cradle of section corresponding to the section of the box forming the housing 1 so as to be engaged with peripheral clearance inside the box forming the housing 1. The plate 2 has opposite side flanges 2.1, 2.2 facing the sides 1.1, 1.2, and a central core 2.5 that extends facing the bottom 1.5 and that connects together the bottom edges of the flanges 2.1 and 2.2.

The inertial measurement unit 3 is itself known, and comprises angular movement sensors of the gyro type, and linear movement sensors of the accelerometer type. The sensors are aligned on the axes of a measurement reference frame and they are connected to an electronic control unit (not shown herein). The sensors are vibrating sensors having predetermined first resonant modes of vibration. In this example, the sensors are microelectromechanical systems or MEMS.

The first suspension stage 10 has four resilient suspension elements, specifically studs 11, 12, 13, and 14 that are made of elastomer and cylindrical in shape. Each of the studs 11 and 12 has one end fastened to the side 1.1 of the box and another end fastened to the flange 2.1 of the plate 2: the studs 11, 12 are in alignment on a diagonal of the sides 1.1. Each of the studs 13 and 14 has one end fastened to the side 1.2 of the box and another end fastened to the flange 2.2 of the plate 2. The studs 13 and 14 are in alignment on a diagonal of the sides 1.2. The studs 11, 12, 13, and 14 are positioned in such a manner that:

the studs 11 and 12 are arranged symmetrically on either side of the middle of the diagonal;

the studs 13 and 14 are arranged symmetrically on either side of the middle of the diagonal and they are spaced apart therefrom by a distance equal to the distance between the studs 11, 12 and the middle of the diagonal on which the studs 11, 12 are in alignment;

the diagonal on which the studs 11, 12 are in alignment is not parallel to the diagonal on which the studs 13, 14 are in alignment; and the central axes of the studs are parallel to one another and perpendicular to the flanges 2.1, 2.2 and to the sides 1.1, 1.2.

The second stage 20 comprises three resilient suspension elements, specifically studs 21, 22, and 23 that are made of elastomer and cylindrical in shape. Each of the studs 21, 22, and 23 has one end fastened to the central core 2.5 and another end fastened to the inertial measurement unit 3, which is arranged between the flanges 2.1 and 2.2 and which is suspended above the central core 2.5. The studs 21, 22, and 23 are positioned at the vertices of a triangle parallel to the central core 2.5. The central axes of the studs 21, 22, and 23 are perpendicular to the central core 2.5.

The first stage 10 has a resonant frequency lower than a bandwidth of the inertial measurement unit 3.

The second stage 20 has a resonant frequency higher than the resonant frequency of the first stage 10 and lower than the first resonant modes of the vibrating sensors. By way of example, for vibrating sensors having first resonant modes higher than 4000 hertz (Hz), and a bandwidth of the order of 500 Hz, the first stage should have a resonant frequency of 100 Hz and the second stage a resonant frequency of 800 Hz.

The first stage 10 has a center of stiffness corresponding substantially to the center of gravity of the assembly formed by the plate 2, the second stage 20, and the inertial measurement unit 3.

The second stage 20 has a center of stiffness corresponding substantially to the center of gravity of the inertial measurement unit 3.

Figure 2:
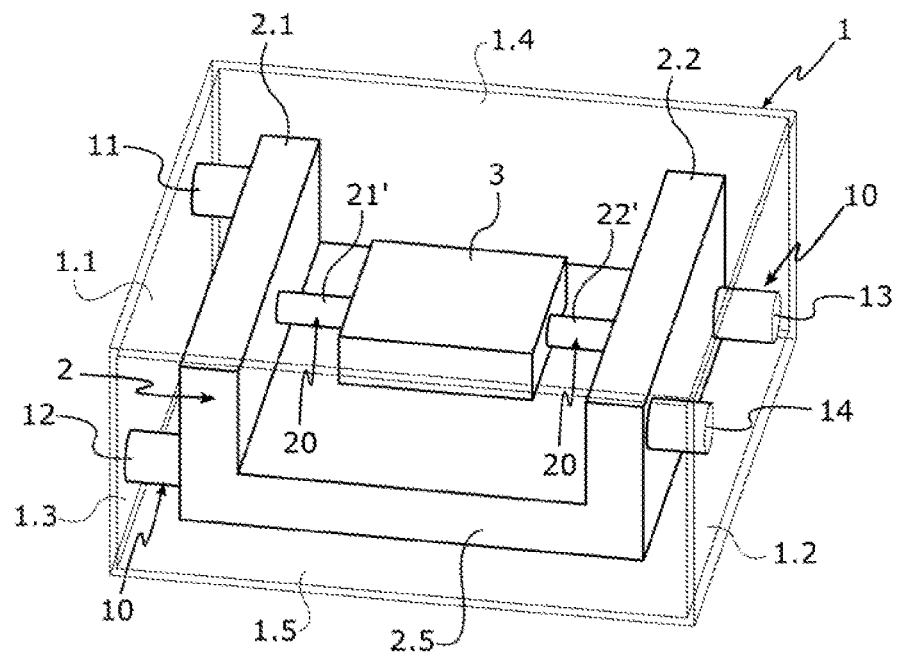
FIG. 2 is a diagrammatic perspective view of a device in a second embodiment.

There follows a description of the second embodiment given with reference to FIG. 2, in which elements that are identical or analogous to those described above are given identical numerical references.

As in the first embodiment, the device in accordance with the second embodiment comprises a housing 1, a plate 2, a first suspension stage having four studs 11, 12, 13, and 14, and an inertial measurement unit 3.

The device also has a second suspension stage, however, in this embodiment it has only two suspension elements, namely studs 21' and 22'. These studs 21° and 22' are made of elastomer and they are cylindrical in shape, and they lie on the same axis. The studs 21' and 22' have central axes that are parallel to the central axes of the studs 11, 12, 13, and 14.

Naturally, the invention is not limited to the embodiments described and covers any variant coming within the ambit of the invention as defined by the claims.

In particular, the second suspension stage may have fewer than three resilient suspension elements, for example two suspension elements or indeed only one for a compact inertial measurement unit.

The positioning of the suspension elements may also be different.

The housing and the plate may be of other shapes. By way of example, the housing may be in the shape of a cradle. By way of example, the plate may be in the form of a box.

The inertial measurement unit may be of a type other than that described, and for example it need not have a MEMS type sensor or it may include sensors having a plurality of sensing axes.

The invention claimed is:

1. An inertial measurement device comprising a housing, a plate connected to the housing via a first stage of suspension, an inertial measurement unit comprising vibrating sensors having predetermined first resonant modes of vibration and mounted on the plate via a second stage of suspension; the first stage has a resonant frequency lower than a bandwidth of the inertial measurement unit, and the second stage has a resonant frequency higher than a resonant frequency of the first stage and lower than the first resonant modes of the vibrating sensors, the first stage having four resilient suspension elements and a center of stiffness corresponding substantially to the center of gravity of the assembly formed by the plate, the second stage, and the inertial measurement unit; the second stage having one to three resilient suspension elements.

2. The device according to claim 1, wherein the second stage comprises three resilient suspension elements.

3. The device according to claim 1, wherein the second stage has a center of stiffness corresponding substantially to the center of gravity of the inertial measurement unit.

4. The device according to claim 1, wherein the inertial measurement unit has MEMS type sensors.

* * * * *